UNITED STATES PATENT OFFICE.

MUNEYASU TSUTSUMI, OF TSURUGA GUN, FUKUI KEN, JAPAN.

SOLID INK.

1,334,722.  Specification of Letters Patent.  Patented Mar. 23, 1920.

No Drawing.  Application filed October 23, 1919. Serial No. 332,830.

*To all whom it may concern:*

Be it known that I, MUNEYASU TSUTSUMI, a subject of Japan, residing at No. 105 Kagura, Tsuruga Machi, Tsuruga Gun, Fukui Ken, Japan, have invented new and useful Improvements in Solid Ink, of which the following is a specification.

This invention relates to an easily soluble solid ink, and the object thereof is to obtain such an ink which does not change its nature nor deliquate even in the wet season, and is easily dissolved in water, hot or cold, leaving nothing undissolved and producing no deposit even when preserved for a long time in liquid state.

To describe my invention more fully, infuse 2 parts of logwood and 8 parts of any desired kind of galls in a mixture of ether, alcohol and water, and dry the infusion by evaporation and powder it.

Next, take a mixture of 15 parts of salicylic acid and 5 parts of sodium bicarbonate, stir the mixture after adding water thereto and dry it with a low heat. Dissolve the sodium salicylate thus obtained in alcohol and cause it to crystallize, and powder the crystals thus obtained.

Next, dilute 15 parts of strong aqua ammonia in 20 parts of water and add thereto very slowing 10% solution of ferrous sulfate. Then precipitates will be formed. Wash these precipitates with water until it shows no sulfuric acid reaction, then add thereto 40 parts of water and 9 parts of potassium bitartrate, and filter it after warming it to a low temperature. Leave the filtered liquid in a dark place for a certain time, then cause it to evaporate, dry it with a low heat and powder it. Thus potassium ferrous tartrate is formed.

Next, dissolve 10 parts of common gum arabic in 200 parts of hot water, and after filtering the liquid, dry it with a low heat and powder it.

Then, mix various powders prepared as described above in the following proportions that is, 60 parts of extract of logwood and galls, 0.2 part of sodium salicylate, 30 parts of potassium ferrous tartrate and 7 parts of gum arabic. Add thereto a suitable proportion of " soluble blue " or " fast blue," and the solid soluble ink of my invention is produced. It is in powdered condition but can be formed into cakes by pressing it in a pressing machine, and when dissolved, it gives a blue black ink which is most extensively used. To give the ink different hues, the proportions of the various ingredients may be altered or different dye stuffs may be used.

According to my invention, tannins of logwood and galls combining with potassium ferro tartrate give unchangeable black, which does not cause any deposit to form, and the sodium salicylate which is easily soluble in water, deepens the color besides acting as antiseptic. Thus, the chief characteristics of the ink of my invention are these, that it shows no acid reaction and that it does not produce any deposit at all.

Hitherto, in manufacturing this kind of ink, dextrin or the like has been used, but the ink so manufactured produces deposits, can not be preserved as it absorbs moisture and deliquates, and is liable to fade. These drawbacks are all removed according to my invention.

Claim.

A solid ink characterized by the composition of extracts of logwood and galls, sodium salicylate, potassium ferrous tartrate, gum arabic, and a water soluble dye.

In testimony whereof I have signed my name to this specification.

MUNEYASU TSUTSUMI.